(12) United States Patent
Baker et al.

(10) Patent No.: US 8,755,992 B2
(45) Date of Patent: Jun. 17, 2014

(54) SYSTEM AND METHOD FOR SENDING AIR TRAFFIC DATA TO USERS FOR DISPLAY

(71) Applicant: FlightAware, LLC, Houston, TX (US)

(72) Inventors: Daniel Baker, Houston, TX (US); David Cameron McNett, Houston, TX (US); Karl Lehenbauer, Houston, TX (US); David Chouinard, Brossard (CA); Jeffrey A. Lawson, Austin, TX (US); Michael Dayah, Knoxville, TN (US); Mark L. Duell, Jr., Houston, TX (US)

(73) Assignee: FlightAware, LLC, Houston, TX (US)

( * ) Notice: Subject to any disclaimer, the term of this patent is extended or adjusted under 35 U.S.C. 154(b) by 0 days.

(21) Appl. No.: 14/074,318

(22) Filed: Nov. 7, 2013

(65) Prior Publication Data

US 2014/0067244 A1 Mar. 6, 2014

Related U.S. Application Data

(63) Continuation of application No. 13/369,404, filed on Feb. 9, 2012, now Pat. No. 8,606,508.

(51) Int. Cl.
| | |
|---|---|
| G06F 19/00 | (2011.01) |
| G01C 21/00 | (2006.01) |
| G08B 21/00 | (2006.01) |
| G06Q 30/02 | (2012.01) |
| G08G 5/00 | (2006.01) |
| G06Q 50/14 | (2012.01) |

(52) U.S. Cl.
CPC .............. *G08G 5/0013* (2013.01); *G06Q 30/02* (2013.01); *G08G 5/0026* (2013.01); *G06Q 50/14* (2013.01)
USPC .............. 701/120; 701/14; 340/971; 340/945

(58) Field of Classification Search
CPC . G08G 5/0013; G08G 5/0021; G08G 5/0026; G08G 5/0034; G08G 5/0082; G08G 5/00; G08G 5/0039; G08G 5/0052; G08G 5/0078; G08G 5/0086; G08G 5/0091; G06Q 30/02; G06Q 50/14; G06Q 10/00; G06Q 10/10; G06Q 30/0256
USPC .............. 701/120, 14, 482, 10, 528; 340/971, 340/531, 945; 705/26.1, 14.1, 333; 342/454; 715/769, 771; 707/758, 707/E17.03, E17.107
See application file for complete search history.

(56) References Cited

U.S. PATENT DOCUMENTS

| | | |
|---|---|---|
| 6,496,777 B2 | 12/2002 | Tennison et al. |
| 6,661,353 B1 | 12/2003 | Gopen |

(Continued)

OTHER PUBLICATIONS

Aircraft Situation Display to Industry: Functional Description and Interface Control Document, Version 4.0, Aug. 4, 2000, Volpe Center Automation Applications Division, DTS-56, 55, Broadway St., Cambridge, MA 02142.

*Primary Examiner* — Muhammad Shafi

(74) *Attorney, Agent, or Firm* — Woodard, Emhardt, Moriarty, McNett & Henry LLP

(57) ABSTRACT

A computer-implemented system and method for the processing and presentation of aviation information is disclosed. At plurality of flight information is received over a digital network and is stored in at least a database. The database includes aviation information. Upon receiving a user request, a server retrieves a result set from the database and transmits it to the requesting user. Subsequently, updates as to a flight identified in the request are transmitted at a selected rate, which may be modified automatically based on one flight characteristic, for subsequent display. In one form, the results may be presented to the user in the form of digital map having aircraft images.

11 Claims, 5 Drawing Sheets

(56) References Cited

U.S. PATENT DOCUMENTS

| | | |
|---|---|---|
| 7,248,219 B2 | 7/2007 | Smith et al. |
| 7,752,302 B2 | 7/2010 | Thasher |
| 7,786,899 B2 * | 8/2010 | Baker et al. .................. 340/971 |
| 7,907,067 B2 * | 3/2011 | Baker et al. .................. 340/971 |
| 7,961,136 B2 | 6/2011 | Stefani et al. |
| 8,497,803 B1 * | 7/2013 | Baker et al. .................. 342/454 |
| 8,577,521 B2 * | 11/2013 | Genissel ........................ 701/14 |
| 2004/0186636 A1 * | 9/2004 | Mendelson et al. ............. 701/9 |
| 2006/0089760 A1 | 4/2006 | Love et al. |
| 2006/0165113 A1 * | 7/2006 | Nonoyama .................. 370/442 |
| 2008/0002190 A1 * | 1/2008 | Romain et al. ........... 356/139.01 |
| 2008/0065480 A1 * | 3/2008 | Baker et al. ..................... 705/14 |
| 2008/0088433 A1 * | 4/2008 | Baker et al. .................. 340/531 |
| 2008/0133507 A1 * | 6/2008 | Alter et al. ........................ 707/5 |
| 2010/0100286 A1 * | 4/2010 | Genissel ........................ 701/48 |
| 2010/0191458 A1 | 7/2010 | Baker et al. |
| 2010/0281411 A1 * | 11/2010 | Baker et al. .................. 715/769 |
| 2013/0120166 A1 * | 5/2013 | Kommuri et al. ............. 340/971 |

\* cited by examiner

SYSTEM AND METHOD FOR SENDING AIR TRAFFIC DATA TO USERS FOR DISPLAY

CROSS-REFERENCE TO RELATED APPLICATIONS

This application is a continuation of U.S. application Ser. No. 13/369,404, filed Feb. 9, 2012, which is hereby incorporated by reference in its entirety.

FIELD OF THE INVENTION

The present invention generally relates to a system and method for receiving and processing flight tracking information and subsequently transmitting a portion of that data in a unique way to a plurality of users. More particularly, the present invention pertains to a flight tracking service accessible over the Internet which pushes flight tracking information indicative of the path of a flight in progress to requesting users to enable subsequent flight path generation and display by the user device.

BACKGROUND OF THE INVENTION

In 1995, the United States Federal Aviation Administration (FAA) made a wealth of minute by minute flight tracking information available for distribution to the public with the creation of the Aircraft Situation Display to Industry (ASDI) service. Through this service, flight tracking data is made available to several vendors who are subsequently able to provide information in a value-added format to their users or subscribers. The ASDI information includes the location, altitude, airspeed, origin, destination, estimated time of arrival and tail number or designated identifier of air carrier and general aviation aircraft operating on at least the corresponding IFR flight plans within U.S. airspace. General aviation VFR flights that include air traffic control flight following are often included. In addition, other sources of flight tracking information are available, including automatic dependent surveillance broadcast (ADS-B) information, which may be utilized independently or in combination with the ASDI data to provide the requested flight tracking information.

Traditional subscribers to such a service include flight departments, charter operators, limousine firms, airframe and power plant manufacturers, air carriers, fixed base operators (FBOs), research firms, and other users. Additionally, users may include business travelers, vacationers, friends and family of travelers, and anyone interested in obtaining flight tracking information With the advent of this type of service, a number of users and subscribers were able to obtain valuable flight information and increase the efficiency and reliability of their own services. However, many services, such as websites, who provide flight tracking information to the public do so on a static basis, in that updating is only accomplished via a refresh requested on the user's device. For example, a husband interested in tracking the progress of his wife's flight must either refresh the website periodically or otherwise configure the browser to frequently poll the flight information service. Conversely, a typical update request is processed by known flight information services as a new request, thereby requiring equal processing power for each update as that required to process the initial request. For example, with each update, a new map, flight path, and the like must be generated and sent to the user, which requires significant processing and bandwidth, particularly when multiplied by thousands of requests occurring each and every minute. The present invention solves a number of these problems as well as other problems present in the aviation information industry, as are illustrated in the descriptions that follow.

SUMMARY OF THE INVENTION

Various technologies and techniques are disclosed for receiving, processing, and transmitting for display flight tracking information collected from a substantially real-time source. In one embodiment, a flight tracking information service is accessible from a web-browser over the Internet. The service provides updated positional information in response to a selection regarding at least one flight.

One form of the present invention is a flight tracking information service which provides a browser-based application capable of receiving flight tracking information, determining a flight path, and displaying the flight path on a map.

Another form is a flight tracking information service which provides a browser-based application capable of receiving flight tracking information pushed from the service and determining an updated flight path and displaying that updated flight path on a map.

Yet other forms, embodiments, objects, advantages, benefits, features, and aspects of the present invention will become apparent from the detailed description and drawings contained herein.

This summary is provided to introduce a selection of concepts in a simplified form that are described in further detail in the detailed description and drawings contained herein. This Summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION OF THE SPECIFIC EMBODIMENTS

Figure 1:
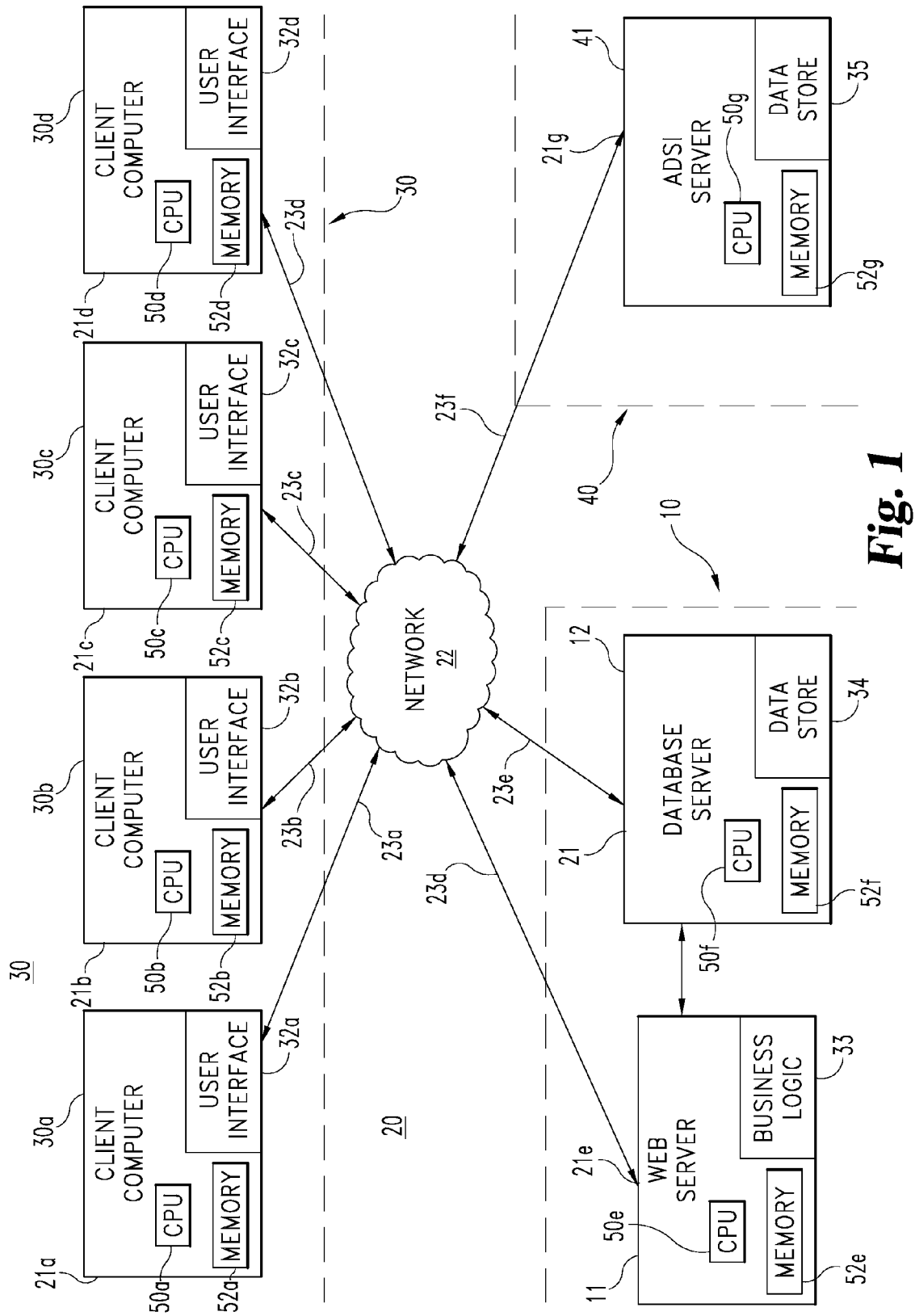
FIG. 1 is a diagrammatic view of a computer system of one implementation.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

At any given moment there are likely to be more than 5,000 aircraft flying above the United States. In the course of a single day, more than 50,000 flights are completed from destination to destination. These numbers are growing at a staggering rate and will undoubtedly continue to rise as the need for commercial and private passenger flights increases coupled with the quickly growing number of aircraft used in the shipping industry.

Currently, systems exist which provide current flight tracking information. Users can obtain information such as the flight plan or status of an aircraft using identifiers such as its flight or tail number. This enables users to check up on flights of their family or friends, business owners to maintain the current status of their aircraft, and many other related service industries to predict departure/arrival times.

FIG. 1 is a diagrammatic view of computer system 20 of one embodiment of the present invention. In the illustrative embodiment, computer system 20 includes aviation information service 10, flight information provider 40, and client computers 30. Computer system 20 also includes computer network 22. Computer network 22 couples together a number of computers 21a-21g over network pathways 23a-23g, respectively. More specifically, system 20 includes several servers, namely Web Server 11 and Database Server 12 of aviation information service 10, and ASDI Server 41 of flight information provider 40. System 20 also includes client computers 30a, 30b, 30c, and 30d (collectively 30). While computers 21a-21g are each illustrated as being a server or client, it should be understood that any of computers 21a-21g may be arranged to include both a client and server. Furthermore, it should be understood that while seven computers 21a-21g are illustrated, more or fewer may be utilized in alternative embodiments. Preferably, service 10 includes a collection of Web servers 11 for receiving, processing, and responding to user queries.

Computers 21a-21g include one or more processors or CPUs (50a, 50b, 50c, 50d, 50e, 50f and 50g, respectively) and one or more types of memory (52a, 52b, 52c, 52d, 52e, 52f and 52g, respectively). Each memory 52 preferably includes a removable memory device. Each processor 50 may be comprised of one or more components configured as a single unit. When of a multi-component form, a processor 50 may have one or more components located remotely relative to the others. One or more components of each processor 50 may be of the electronic variety defining digital circuitry, analog circuitry, or both. In one embodiment, each processor 50 is of a conventional, integrated circuit microprocessor arrangement, such as one or more OPTERON processors supplied by ADVANCED MICRO DEVICES Corporation of One AMD Place, Sunnyvale, Calif. 94088, USA.

Each memory 52 (removable, fixed or both) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types, or other types not included in the above list. Also, each memory may be volatile, nonvolatile, or a hybrid combination of volatile and nonvolatile varieties.

Although not shown to preserve clarity, one or more of computers 21a-21g may be coupled to a display and/or may include an integrated display. Computers 21a-21g may be of the same type, or a heterogeneous combination of different computing devices. Likewise, displays may be of the same type, or a heterogeneous combination of different visual devices. Although again not shown to preserve clarity, each computer 21a-21g may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible. It shall be appreciated that client computers 30a-30d, or any other computer 21 for that matter, may be of an alternate type, such as a mobile device utilizing the iOS, Android, or any other operating system. This specifically includes iPhones and iPads (manufactured by Apple, Inc., located at 1 Infinite Loop Cupertino, Calif. 95014), Kindles (manufactured by Amaon.com, Inc., located at 1200 12th Avenue South, Suite 1200, Seattle, Wash. 98144-2734), Android phones/tablets (manufactured by various manufacturers), and other similar devices.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers like computers 21a-21g can be coupled together by computer network 22.

In one embodiment, system 20 operates at one or more physical locations. Web Server 11 is configured as a web server that hosts application business logic 33 for an aviation information engine, Database Server 12 is configured as a database server for storing aviation information provided by ASDI Server 41, and at least one of client computers 30a-30d are configured for providing a user interface 32a-32d, respectively, for accessing the aviation information service 10. Preferably, Database Server 12 maintains at least one year of historical flight tracking information, and most preferably maintains at least three years. In a further form, Database Server 12 maintains data store 34 as a memory-resident database to provide more advanced searching functionality and minimize response times. User interface 32a-32d of client computers 30a-30d can be an installable application such as one that communicates with Web Server 11, can be browser-based, and/or can be embedded software, to name a few non-limiting examples.

In one embodiment, software installed locally on client computers 30a-30d is used to communicate with Web Server 11. Alternatively, client computers 30 may be referred to herein as user devices 30. In another embodiment, Web Server 11 provides HTML pages, data from web services, and/or other Internet standard or company proprietary data formats to one or more client computers 30a-30d when requested. One of ordinary skill in the art will recognize that the term web server is used generically for purposes of illustration and is not meant to imply that network 22 is required to be the Internet. As described previously, network 22 can be one of various types of networks as would occur to one of ordinary skill in the art. Database (data store) 34 on Database Server 12 can store data such as flight tracking information, departure/arrival notices, flight plans, historical flight information, and/or aircraft information to name a few representative examples.

In the illustrative embodiment, flight tracking information is received from ASDI Server 41 which is at least one server that is a part of the Aircraft Situation Display to Industry Service (ASDI) provided by the Federal Aviation Administration (FAA). The feed provided by the ASDI service may be in real time or delayed, such as subject to a five minute delay. Connections to the feed are established in a structured format according to *Aircraft Situation Display to Industry: Functional Description and Interface Control Document*, published by the Federal Aviation Administration, which is herein incorporated by reference in its entirety.

Typical applications of system 20 would include more client computers like computers 30a-30d at more physical locations, but only four have been illustrated in FIG. 1 to preserve clarity. Furthermore, although two servers 11 and 12 are shown, it will be appreciated by those of ordinary skill in the art that the one or more features provided by Web Server 11 and Database Server 12 could be provided by the same computer or varying other arrangements of computers at one or more physical locations and still be within the spirit of the invention. Farms of dedicated servers, a single proprietary system, and/or a Storage Area Network (SAN) could also be provided to support the specific features if desired. In the illustrative embodiment, in order to flexibly handle the large quantity of flight information received by service 10, Database Server 12 includes a relational database, such as SQL, as in known to one of skill in the art.

Figure 2:
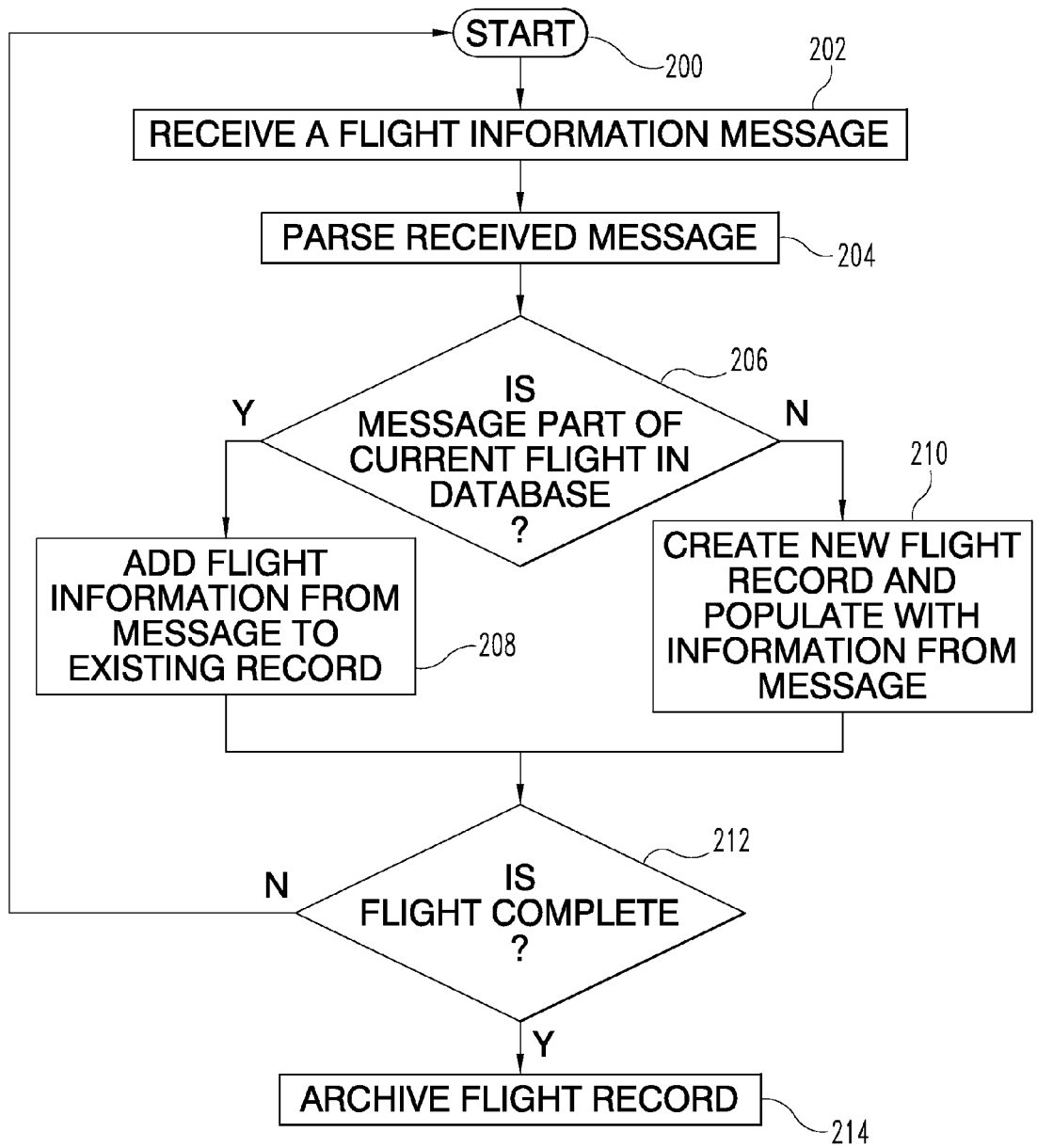
FIG. 2 is a process flow diagram demonstrating one example of the steps involved in receiving and processing flight tracking information in one embodiment of the present system and method illustrated in FIG. 1

Turning to FIG. 2, with continued reference to FIG. 1, a flowchart illustrating the process of receiving and handling flight information is illustrated. The process begins at start point 200 with the service 10 receiving a flight information message (stage 202) from ASDI server 41. In one form, the flight information messages are received and processed by Database Server 12. In other forms, various other servers may process the data prior to entry into the data store 34. The flight information messages may be of a variety of different types, with each type providing various fields of information. Shown below are a few representative examples of the type of messages received by Database Server 12:

| Message Type: | Content: |
| --- | --- |
| NAS AF | revised flight plan data whenever a flight plan is amended |
| NAS AZ | arrival data for all eligible arriving flights |
| NAS DZ | departure message |
| NAS FZ | initial flight plan data |
| NAS RZ | cancellation data |
| NAS TZ | flight position updates |
| NAS UZ | ARTCC flight plan information |

Upon arrival, the flight information message is identified and assigned a type based upon the established formats provided by the ASDI service. Once the type of the message is identified, the message is parsed (stage 204) and the data is converted into a suitable format for insertion into Database Server 12. In one form, stage 204 may include the decoding of a message, the conversion of binary numbers to standard integers, the conversion of characters into words, and any other data conversion that may be required based upon the format of the received message and the format of the desired information for subsequent handling.

Once the contents of the message are obtained, service 10 identifies whether or not the message relates to an existing flight in the data store 34 (stage 206). If an existing flight record is found to which the contents of the message relate, the contents of the message are coupled with the existing information about the flight and the flight entry is updated (stage 206). In the event that the message does not relate to an existing flight, a new flight record is established and populated with the contents of the message (stage 210).

After a flight record is updated in stage 208 or created in stage 210, the service 10 determines if the flight is complete (stage 212). In the illustrative embodiment, typically a flight is marked complete upon the receipt of an arrival (NAS AZ) or cancellation (NAS RZ) message. In a further form, the service 10 may attempt to predict the arrival of a flight based upon a set of circumstances which may indicate that a flight has completed despite the absence of an arrival message. For example, if a flight record indicates that a flight has recently dropped below radar coverage near its destination proximate to its scheduled arrival time, the service 10 may shortly thereafter enter an arrival message to eliminate the problem of frequent arrival message failure by the ASDI service. In either event, when the flight is determined to be complete the service 10 archives the flight by compacting the flight record to minimize storage requirements going forward (stage 214) and awaits receipt of another flight information message. It shall be appreciated, that any number of flight information messages may be processed in parallel by service 10 and that FIG. 2 is simply illustrative of the sequential path of processing for a single flight information message.

Figure 3:
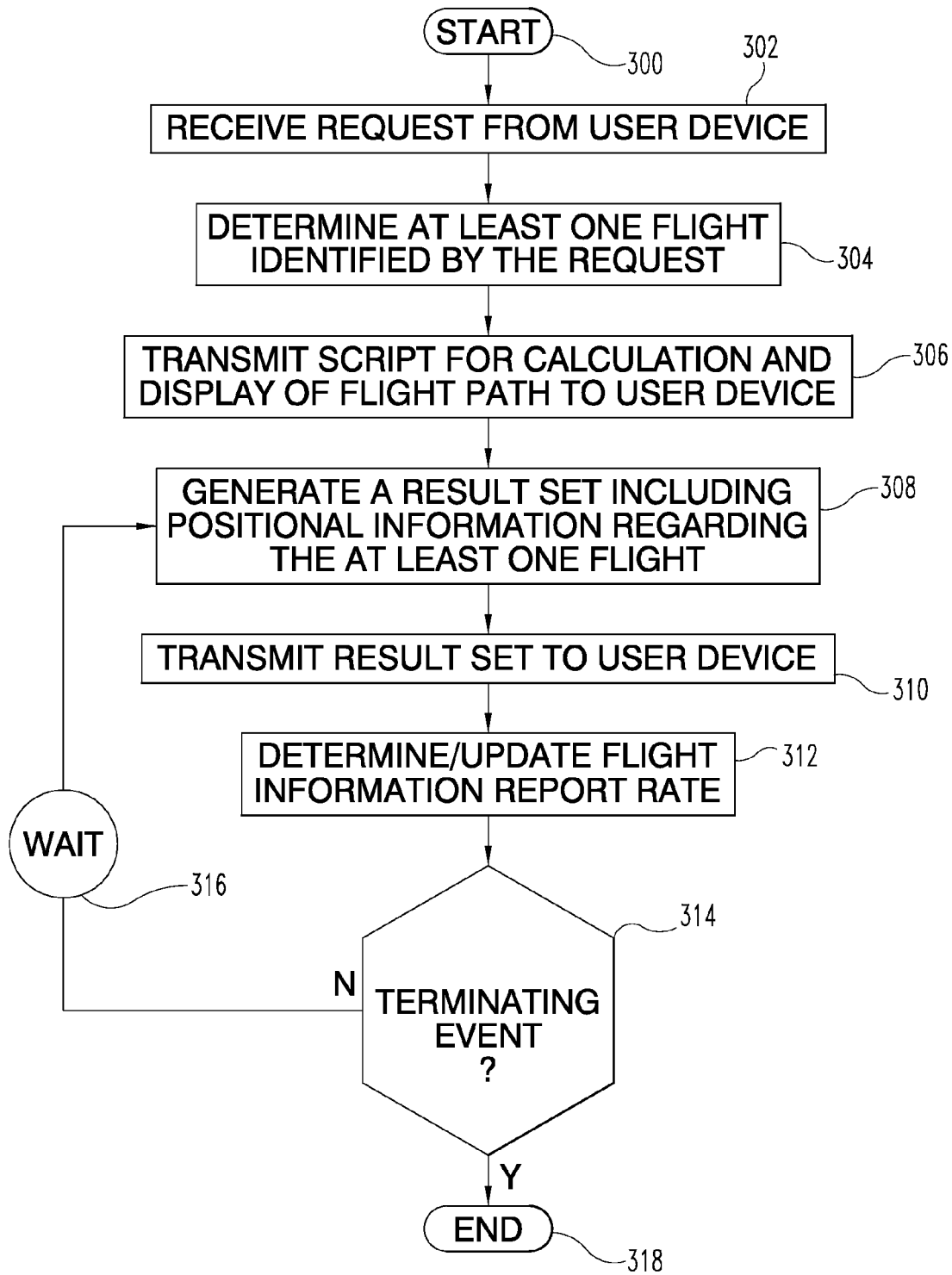
FIG. 3 is a process flow diagram illustrating the steps of receiving and responding to a user request in one embodiment of the present system and method illustrated in FIG. 1.

Turning to FIG. 3, with continued reference to FIG. 1, the process for receiving, processing, and responding to a user request in one embodiment is illustrated. The process begins at start point 300 with the user submitting a request (stage 302) to the aviation information service 10 using a user interface, such as user interface 32 of client computer 30. In one form, the user interface, such as 30a, may provide a predetermined structured format for entry of and subsequent transmission of the request. The user request is then transmitted by computer 30 over network 22 to Web Server 11. The user request may include either a single term or a variety of terms in combination. These terms may include flight number, tail number, departure time, departure location, arrival time, arrival location, altitude, air speed, proximity to a specific location, and/or the class of airspace (whether uncontrolled Class G, or controlled Class A, B, C, D or E), as well as weather related conditions such as wind speed and direction, temperature, barometric pressure, density altitude, measured ceiling, cloud tops, precipitation, visibility, status of weather as to IFR, VFR or MVFR, to name a few examples.

From the user request the aviation information service 10 determines at least one flight which is identified by the request (stage 304). In one form, the user request identifies at least one flight which is either awaiting takeoff or currently in progress. By way of non-limiting example, the identified flight may be: the current flight of the aircraft having a tail number specified by the user in the request, a flight destined for a specified location/airport, a commercial flight identified by flight number, a flight identified by origin and destination, or a flight otherwise selected by the user based on their request in any other way which shall be appreciated by one of skill in the art.

At some time prior to step 310, but potentially before any of the preceding steps, in some embodiments, Web Server 11 transmits to user device 30 a script (such as a Java script), application, or some other executable to be run by user device 30 in order to determine and display a flight path for the at least one flight upon receipt of positional information (stage 306). The functionality of this script, application, or other client side software will be discussed below with respect to the illustrative screenshots. It shall be appreciated that the script, application, or the like may be transmitted to user device 30 in many forms, such as via an application store, direct download, automated download and install, or the like.

Once the request is received by service 10 at Web Server 11, the request is parsed and executed upon the database of current and historical flight information stored in data store 34 by business logic 33. A result set is generated (stage 308) which includes at least one recent position of the at least one flight identified by the request submitted by the user. Additionally, the result set may include additional information concerning the at least one flight, such as its airspeed, turn rate, altitude, rate of climb/descend, or some other known or calculable flight characteristic.

After the result set is prepared in stage 308, Web Server 11 transmits the result set to the requesting user device (stage 310). In one form, Web Server transmits a first result set in response to the user request received in stage 402 including information about the flight in addition to positional information. Such information may include the flight's origin, destination, operator, take-off time, and scheduled arrival time. However, in this form, further result sets sent to the requesting user device are pushed to the user device. One of skill in the art shall appreciate that a push, or a similar type arrangement, as opposed to polling, which is common in web-browsers, provides for the active delivery of result sets (and positional information) by Web Server 11 to the requesting user device when the information becomes available, or when an update is warranted, as determined by service 10.

After the creation of the initial result set and transmission of that result set to the user device 30, service 10 determines a rate suitable for reporting future flight information, such as updated flight positioning information, to user device 30 (stage 312). In one form, the rate is determined based upon at least one flight characteristic, such as the status of the flight, its altitude, turn rate, proximity to it destination, or the like. This enables flight positioning data to be reported more frequently, to provide an accurate flight path to user device 30, when the changes to the flight's path are likely to occur as opposed to other times when they are less likely to occur. For example, during taxi, takeoff, approach, landing, and/or when the flight is in a holding pattern, the track of the aircraft is much more likely to change, thus warranting a higher positional reporting rate. However, when a flight is at cruising altitude or waiting at a gate, the need for more frequent positional updates is reduced, as its path is much more predictable. In one form, the positional reporting rate is once per minute during cruising, which the rate being changed by at least 25% in response to a turn, climb, descent, or other similar event. In a further form, the rate is changed by at least 50% in order to speed up or slow down updates of positional locations in order to provide more accurate data or to save computational and bandwidth resources. For purposes of illustration, the table below provides exemplary rates for transmitting future flight information which provides a satisfactory level of detail as well as computational and bandwidth efficiency:

| Flight Characteristic: | Exemplary Determining Criteria | Report Rate |
| --- | --- | --- |
| At Gate | On ground, not moving | 1 min (or only report when movement occurs) |
| Taxi | On ground, moving | 5 secs |
| Takeoff | Climb rate | 3 secs |
| Cruising | Alt >10,000, no climb rate | 30 secs |
| Banking/Altitude change | Turn rate or climb rate >.3 deg./sec. | 10 secs/turn or climb rate |
| Descent | | 10 secs |
| Holding pattern | | 2 secs |

Additionally, the above criteria may be bounded by a maximum report rate of 2 reports per second and a minimum of one report per 30 seconds during flight.

Following stage 312 the process proceeds to stage 314 where the service 10 checks for a terminating event, such as the end of the at least one flight or all identified flights or a user disconnect or the stop request. If a terminating event is detected, then the process ends at end point 318. Otherwise, the process proceeds to stage 316 when the service 10 waits the appropriate amount of time in order to meet the currently selected rate from stage 310 before repeating stages 308 and 310 to report new flight information to user device 30. Additionally, the service 10 may repeat step 312 or alternatively perform it only when a flight characteristic is detected as having changed. It shall be appreciated that the service 10 may receive data at a rate much higher than the rate selected in stage 312 and that a rate should not be selected in stage 312 which would exceed the rate of service 10's data feed, such as from flight information provider 40.

The receipt of the aviation information described above by user device 30 and the described client side software of stage 306 results in the generation and display of a corresponding flight position. In the illustrated embodiment, the following displays are generated by the client side software operating on user device 30.

Figure 4:
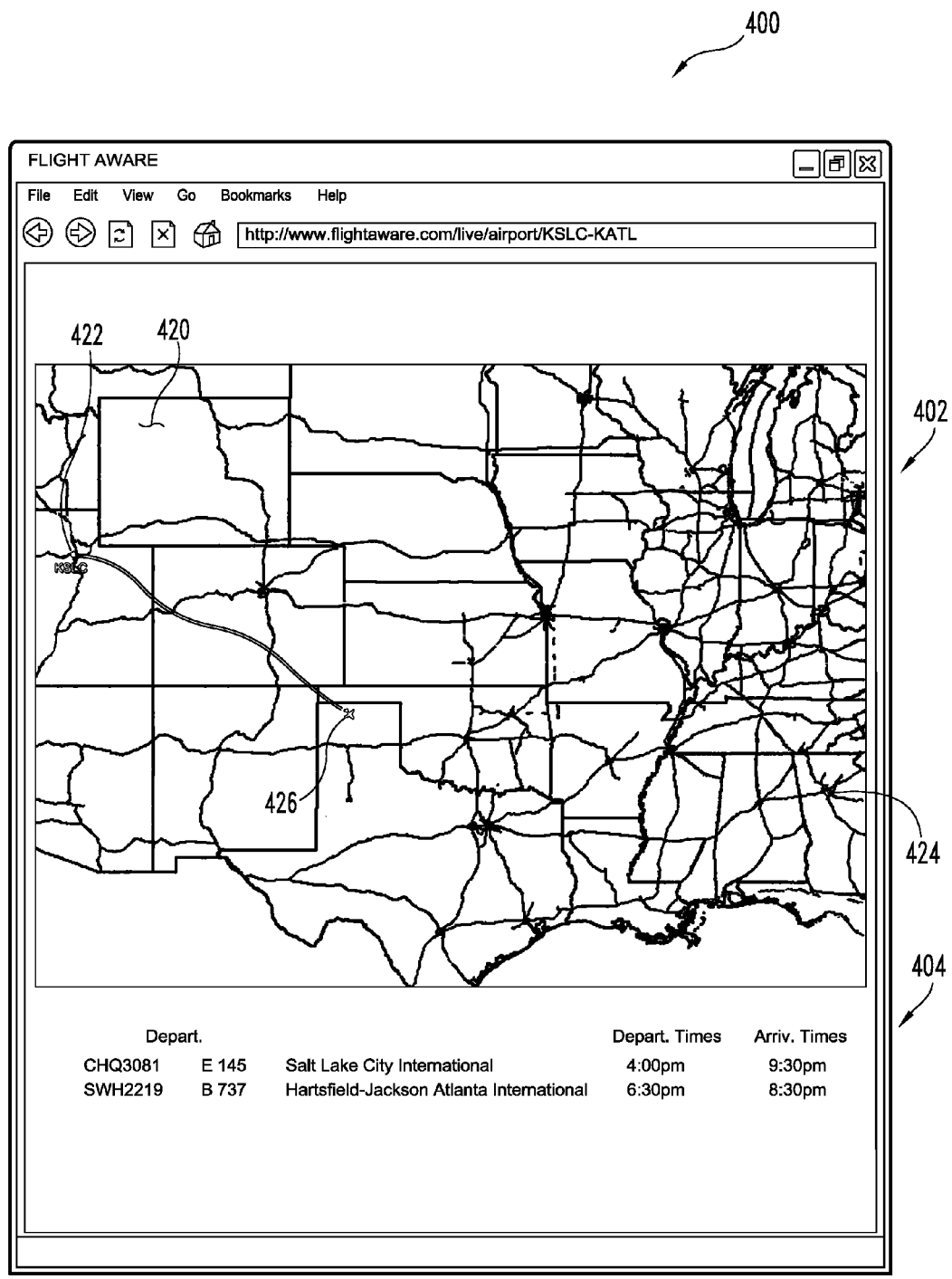
FIG. 4 is a diagrammatic view of a result displayed to a user in one form of the present system and method illustrated in FIG. 1.

FIG. 4 illustrates a representative web-page presented by user device 30 in conjunction with service 10 in response to a specific commercial flight request. It shall be appreciated that the representative web-page would be suitable for use in an arrangement where the user device 30 utilizes a web browser. However, other embodiments are contemplated, such as an installable application on a computer or mobile device, to name just a few, which would provide a similar image to that presented in FIG. 4, however, it may or may not necessarily be in the form of a web page.

In this illustrative example, the user submitted request identifies a flight between Atlanta, Ga. and Salt Lake City, Utah. The result is displayed on web page 400 having main display portion 402 and result display portion 404. Main display portion 402 includes an electronic map 420 which may be a standard map, a topographical map, a political map, an IFR or VFR aeronautical chart, an aerial photography map, or any other type of map or combination of maps or overlays known to one of skill in the art. In the illustrated form, the map is updated based upon the receipt of additional flight information, such as updated positional information, which is processed by user device 30, without redrawing the remainder of web page 400. In a further form, electronic map 420 may be a three-dimensional map or an electronic simulation.

In the illustrated form, the map includes airports 422 and 424, which are the origin and destination airports respectively for the displayed flight which was identified by the user request. The current position of the flight is indicated by aircraft image 426, which may be an image of the type of aircraft associated with the flight or a generic symbol, such as a typical aircraft shape, as shown. In addition, in one form the aircraft 426 is oriented to properly indicate its most recent heading in flight. In a further form, each aircraft image, such as aircraft 426, may be shown in a certain degree of roll, thereby indicating a current turn rate or some other information, such as rate of climb, bank angle, or the like which is either received from or based upon information, both current and/or past, received from service 10.

Additionally, the result portion 404 displays several key pieces of information concerning the results identified by the service 10 based on the user submitted request. In this example, the two current flights are displayed along with identifying information. Other information which may be displayed includes current airspeed, current altitude, flight time, and estimated flight time remaining The result display portion 404 may also include historical results and/or related results.

Additionally, in the illustrated form, each aircraft is oriented to properly indicate the heading of one or more displayed aircraft in flight and includes a trailing line, such as line 430, showing the recent flight path of their associated aircraft, such as aircraft 426. Preferably, the line is smoothed using cubic spline calculations to approximate the flight path of the aircraft between positions based upon a recent subset of or all of the prior positions of the associated flight known by user device 30. In one form, the flight path preferably includes less than 200 miles of the path so as not to clutter the screen when multiple aircraft are displayed simultaneously. More preferably, less than 100 miles of the path are displayed, and most preferably between 5 and 50 miles are displayed. Additionally, in an alternate form, the path may display only a set amount of the flight time, such as 10 minutes or less, or preferably 5 minutes or less, thereby indicating the airspeed of the flight relative to other illustrated flights. Still further other parameters may be used to determine the length of the displayed line, such as a combination of speed, time, and aircraft type. The line may be widened or lengthened, for example, for heavy planes, to reflect possible wake turbulence, or merely to visually give an illustrative weight component to the display. The line may be wider near the aircraft than further away. Additionally, the line may be colored or otherwise modified to indicate other attributes of the flight such as if the aircraft is climbing, descending, speeding up, slowing down, etc. Additionally, in one form aircraft 426 is shown in electronic map 420 in animation traveling from one point to the next. This is accomplished by introducing a slight delay and displaying the aircraft in animation between its two most recently received positions while awaiting the new position. In one implementation, the animation of an aircraft, such as aircraft 426, beings from the previously received point and is set to travel to the most recently received location when that location is received.

Figure 5:
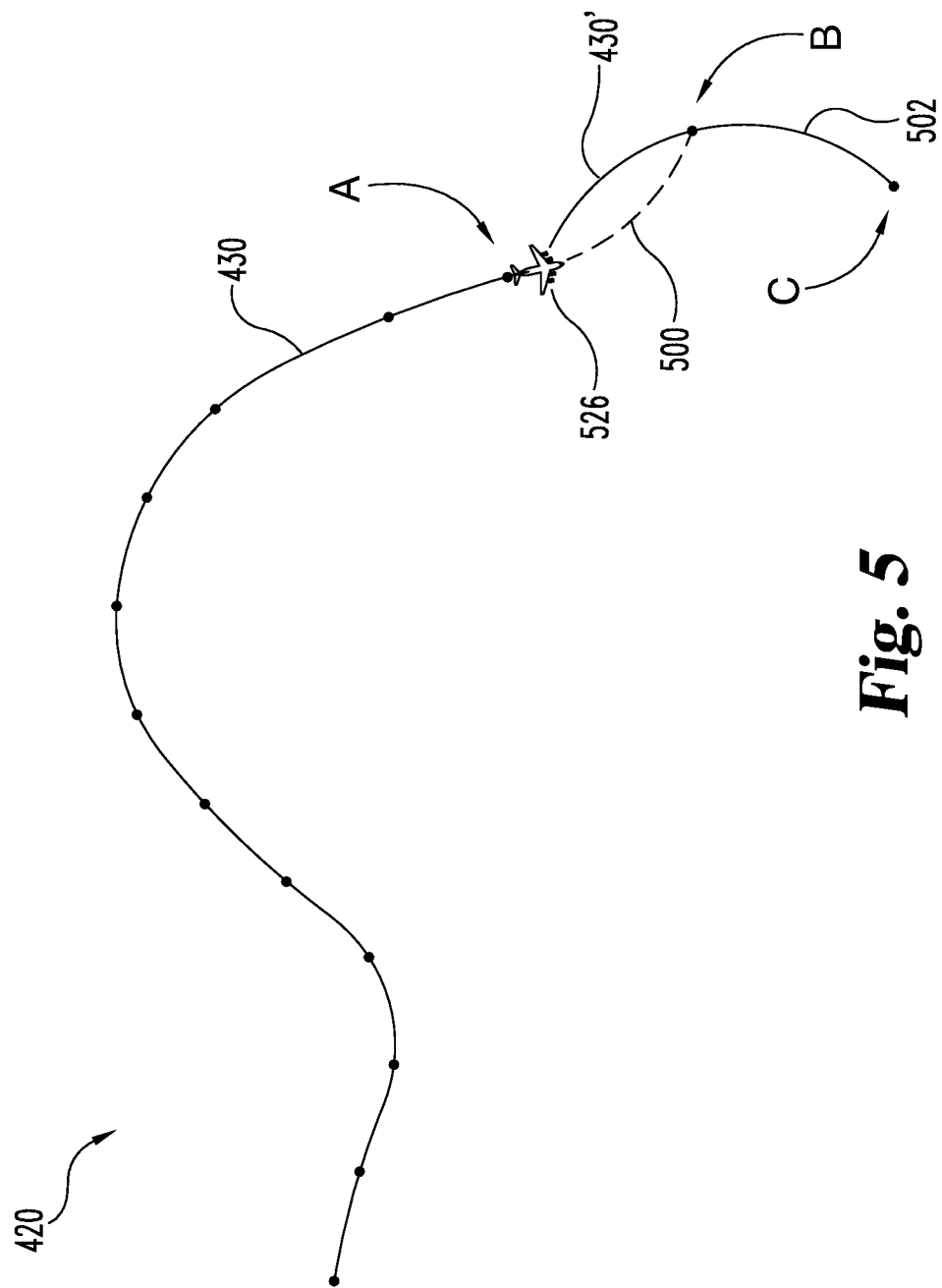
FIG. 5 is a diagrammatic view of a basic version of electronic map 420 of FIG. 4, which has been simplified for ease of illustration.

For purposes of illustrating the above, FIG. 5 shows a basic version of electronic map 420 which as been simplified for ease of illustration. For example, assume client side software on user device 30 receives one positional location (point A) for aircraft 526 as well as a subsequent positional location (point B). Based upon the prior positional locations, the aircraft's speed, turn rate, and/or any other information, a predicted flight path 530 is fit to the prior positions up to and including the most recent position. Based upon this predicted path 430, the electronic map 420 may be displayed by user device 30 with the aircraft 426 being animated as traveling along segment 500 of the predicted path 430 from point A to point B. Upon the receipt of a subsequent position (position C), the projected path 430 may be altered, thereby resulting in an update of displayed path 430 to new path 430', and further animation along the segment 502a of new path of aircraft 526 from point B to point C. The length of the segments between points A, B, and C is determined by the aircraft's speed and the rate at which positional reports are communicated to user device 30, as is described herein with respect to stage 312 of FIG. 3.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A method for distributing flight tracking information to a user comprising the steps of:
    maintaining an electronic database storing aviation related information;
    receiving electronic flight tracking information from a substantially real-time source, wherein said flight tracking information is delayed by about five minutes or less;
    storing at least a portion of said flight tracking information in a formatted form in said database;
    receiving a request, using the hypertext transfer protocol from a user device through a digital network identifying at least one flight currently in progress;
    repetitively selecting, using a computer processor, a result set from said database at, at least a first rate, wherein said result set includes at least one position of said at least one flight;
    transmitting using a server at least a portion of said result set to the user device using said digital network at, at least said first rate as determined by the number of position reports per unit time;
    determining that at least one characteristic of said at least one flight selected from the group consisting of at gate, taxi, takeoff, cruising, speed, banking, altitude change, holding pattern and turn has changed based on said flight tracking information;
    altering said first rate by at least 25% based upon said at least one characteristic to establish a second rate; and
    transmitting using a server at least a second portion of said result set to the user device using said digital network at, at least said second rate as determined by the number of position report per unit time.

2. The method of claim 1, wherein said flight tracking information is delayed by less than approximately 5 minutes.

3. The method of claim 2, wherein said substantially real-time source is the FAA Aircraft Situation Display to Industry service.

4. The method of claim 2, wherein said substantially real-time source includes automatic dependent surveillance broadcast (ADS-B) information.

5. The method of claim 2, wherein said at least one flight is a flight currently in-progress.

6. The method of claim 1, wherein said request contains at least one search criteria selected from the group consisting of aircraft type, flight route, airport facility, destination, and origin.

7. The method of claim 1, wherein said request contains at least one flight identifier from the group consisting of flight number, tail number, commercial airline, and a origin/destination combination.

8. The method of claim 1, wherein said digital network comprises the Internet.

9. The method of claim 1, wherein said transmitting is accomplished using the hypertext transfer protocol.

10. The method of claim 1, wherein said first rate is altered by at least 50%.

11. The method of claim 1, wherein said repetitively selecting occurs periodically.

* * * * *